United States Patent
Enomoto et al.

(10) Patent No.: US 6,848,551 B2
(45) Date of Patent: Feb. 1, 2005

(54) ONE-WAY CLUTCH

(75) Inventors: Isao Enomoto, Tokyo (JP); Nobuyoshi Honda, Tokyo (JP)

(73) Assignee: Tok Bearing Co., Ltd., Tokyo (JP)

( * ) Notice: Subject to any disclaimer, the term of this patent is extended or adjusted under 35 U.S.C. 154(b) by 0 days.

(21) Appl. No.: 10/116,781

(22) Filed: Apr. 4, 2002

(65) Prior Publication Data

US 2002/0148696 A1 Oct. 17, 2002

(30) Foreign Application Priority Data

| Apr. 11, 2001 | (JP) | ................................ 2001-113006 |
| May 29, 2001 | (JP) | ................................ 2001-160546 |

(51) Int. Cl.[7] .......................................... F16D 41/066
(52) U.S. Cl. ................................ 192/45; 192/107 T
(58) Field of Search ........................ 192/45, 107 T, 192/44, 110 R

(56) References Cited

U.S. PATENT DOCUMENTS

| 5,165,509 | A | * | 11/1992 | Kanno et al. ................. 192/44 |
| 5,338,996 | A | * | 8/1994 | Yamamoto .................... 310/217 |
| 6,308,811 | B1 | * | 10/2001 | Chang ............................ 192/45 |
| 6,333,112 | B1 | * | 12/2001 | Field et al. ................. 192/41 R |
| 6,454,069 | B2 | * | 9/2002 | Oh .................................. 192/45 |
| 6,575,279 | B2 | * | 6/2003 | Quigley ......................... 192/45 |
| 2002/0070088 | A1 | * | 6/2002 | Hsu ................................ 192/45 |
| 2002/0179391 | A1 | * | 12/2002 | Cox et al. ...................... 192/44 |
| 2002/0179392 | A1 | * | 12/2002 | Quigley ......................... 192/45 |

* cited by examiner

Primary Examiner—Rodney H. Bonck
(74) Attorney, Agent, or Firm—Steinberg & Raskin, P.C.

(57) ABSTRACT

The provision of a one-way clutch having a high strength and a small size and manufactured significantly readily. The one-way clutch includes a casing for supporting a rotating shaft, and a clutch mechanism provided inside the casing. The clutch mechanism allows the shaft inserted in the casing to slide in the casing when the shaft is rotated in one direction and locks the sliding of the shaft when the shaft is rotated in the other direction. The casing 22 include a laminate of a bottom plate member 23a and a plurality of intermediate plate members 23b. Each of the plate members has a press-fit recess 31 extending on one surface, and a press-fit height 32 which extends on the other surface and is press-fitted into a corresponding press-fit recess 31 of an adjacent plate member.

5 Claims, 14 Drawing Sheets

ONE-WAY CLUTCH

BACKGROUND OF THE INVENTION

1. Field of the Invention

This invention relates to a one-way clutch allowing a rotating shaft to be rotated relatively to a cover when the rotating shaft is rotated in one direction and to be rotated integrally with the cover when it is rotated in the other direction.

2. Description of Related Art

FIG. 12 illustrates the entire configuration of a conventional one-way clutch, and FIG. 13 is a sectional view of the conventional one-way clutch. As illustrated in FIGS. 12 and 13, the one-way clutch includes a cover 1, a casing 2 incorporated inside the cover 1, a cap 3 for the cover 1, and a rotating shaft 4.

The cover 1 includes a cylinder 5 and a closing portion 6 closing one end of the cylinder 5. The cylinder 5 has an inside periphery on which a plurality of fitting heights 7 are formed. The closing portion 6 has a shaft hole 8 for supporting the rotating shaft 4.

The casing 2 has an outer peripheral face on which a plurality of fitting recesses 9 engage with the fitting heights 7 of the cover 1. The casing 2 is incorporated into the inside of the cover 1 by fitting between the fitting heights 7 and the fitting recesses 9. The casing 2 has a shaft hole 10 into which the rotating shaft 4 is inserted, and a plurality of needle holes 12 which are formed around the shaft hole 10 and into which needles 11 are inserted respectively.

Additionally, the casing 2 has a plurality of spring holes 14 formed for insertion of a spring member 13. The spring member 13 is provided for generating a spring force acting on the needles 11, and includes a plurality of springs 15 inserted into the respective spring holes 14, and an annular coupling portion 16 for coupling the plurality of springs 15.

The needle hole 12 and spring hole 14 have a shared are and are connected without a break. The needle hole 12 includes a sloped face 12a and a supporting face 12b opposite to the spring hole 14.

The sloped face 12a is inclined from the spring hole 14 toward the supporting face 12b. Specifically, the length between the sloped face 12a and the side face of the rotating shaft 4 is longer than the diameter of the needle 11 in the proximity of the spring hole 14, and shorter than the diameter of the needle 11 in the proximity of the supporting face 12b. That is, the sloped face 12a and the outer peripheral face of the rotating shaft 4 form a wedge-shaped clamping element.

In the needle hole 12 having the sloped face 12a as described above, the spring force of the spring member 13 acts on the needle 11 to allow it to come in contact with the rotating shaft 14.

The needle 11 and spring member 13, together with the needle hole 12 and spring hole 14 into which they are respectively inserted, form a clutch mechanism c.

The cap 3 closes the other end of the cylinder 5 of the cover 1, and has a shaft hole 17 for supporting the rotating shaft 4.

In the above configuration, the casing 2 is incorporated into the cover 1, and in turn the needles 11 and spring member 13 are incorporated into the casing 2. Then, the cap 3 is put over the cover 1 and casing 2. At this point, an annular height 3a formed on the cap 3 is fittingly snapped in an annular recess 1a formed on the cover 1.

In this way, after the cap 3 is set over the cover 1, the rotating shaft 4 is inserted so as to pass through the shaft hole 8 of the cover 1, the shaft hole 10 of the casing 2 and the shaft hole 17 of the cap 3.

Next the operation in the above configuration will be described.

The rotating shaft 4 is rotated in a direction represented by the arrow X in FIG. 3. Then, with the rotation of the rotating shaft 4 in the direction X, the rotating force and the spring force of the spring member 13 strongly push the needles 11 toward the supporting faces 12b of the needle holes 12. Strongly pushing the needles 11 toward the supporting faces 12b causes the needles 11 to be completely clamped in the respective wedge-shaped clamping elements formed by the sloped faces 12a and the outer peripheral face of the rotating shaft 4.

When the needles 11 are clamped in the clamping elements, each of the needles 11 increases the pressing force against the rotating shaft 4 to lock the rotation of the rotating shaft 4. If the rotating shaft 4 is locked, the rotating shaft 4 cannot rotate relative to the casing 2.

When the rotating shaft 4 is locked so as not to allow a rotation relative to the casing 2, if the rotating shaft 4 is further rotated in the direction X, the casing 2 is also rotated in the direction X with the rotation of the shaft 4.

Conversely, when the rotating shaft 4 is rotated in a direction represented by the arrow Y in FIG. 13, the needles 11 are pushed in the direction Y with the rotation of the shaft 4. When the needles 11 are pushed in the direction Y, the needles 11 flex the springs 15 while moving toward the spring holes 14. The needles 11 are then released from the clamping element because each needle hole 12 has a size in the proximity of the spring holes 14 larger than the diameter of the needle 11. In other words, there is no situation that the needles 11 are pressed toward the rotating shaft 4 to lock the relative rotation between the rotating shaft 4 and the casing 2. That is, the rotating shaft 4 is maintained in free rotation.

Thus, when the rotating shaft 4 is rotated in the direction Y, the rotating shaft 4 rotates relative to the casing 2. In other words, whenever the rotating shaft 4 is rotated in the direction Y, the casing 2 does not rotate with the rotation of the shaft 4.

Such a one-way clutch transfer to the casing 2 a rotative force generated when the rotating shaft 4 is rotated in one direction, and does not transfer to the casing 2 a rotative force generated when it is rotated in the other direction.

The conventional one-way clutch as described above needs high accuracy for the needle hole 12 and spring hole 14 serving as the clutch mechanism c especially. This is because, for example, if the clamping element of the needle hole 12 has a value higher than a set value, when the needle 11 is moved in the direction X, a longer time is required until the rotating shaft 4 is locked. In other words, a longer time is required from when the rotating shaft 4 is rotated until the rotating shaft 4 is locked and its rotation is transferred to the casing 2, resulting in impaired responsivity of the clutch function.

A possible simple means for maintaining accuracy of the needle hole 12 and the spring hole 14 is to use plastics for forming the casing 2 having the needle holes 12 and spring holes 14. Plastics can be used for molding, which provides a high accuracy.

However, plastics are sensitive to heat. Hence, when the casing 2 is molded of such plastics as described above, there is a problem of the impossibility of using the one-way clutch having such a plastics-made casing in high temperatures. Hence, this method is hardly ever employed.

Therefore, the casing 2 is formed of a sintered metal, because sintered metal is resistant to heat and additionally allows the forming of the spring hole 14 and the needle hole 12 with high accuracy. However, using a sintered metal requires a complicated molding process to provide a complicated configuration, and a high degree of technology, resulting in a high molding cost. This creates the problem that the entire one-way clutch is costly.

Using a sintered metal produces another problem of a low strength. Specifically, as explained earlier, when the rotating shaft 4 is rotated in the direction X, the needle 11 is pressed against the sloped face 12a with a strong force. In addition, when the relative rotation between the rotating shaft 4 and the casing 2 is locked and this lock state is maintained, the needle 11, especially, is pressed against the sloped face 12a of the needle hole 12 with a very strong force. For resisting the pressing force, the casing 2 needs a high strength.

Therefore, there is another method devised for forming the needle hole 12 and spring hole 14 with high accuracy using a metal as explained below. This is a method of forming the needle holes 12 and spring holes 14 on a metal plate member through a press process, and then laminating a plurality of the resulting plate members.

In an additional possible step, after completion of laminating the metal plate members, the laminated plate members are press-fitted for maintaining the lamination. FIG. 14 illustrates a plate member 18 used for a core of a motor.

The plate member 18 includes an annular member 19, branch-shaped portions 20 which are provided to the annular member 19 and on which a leading wire is wound, and dot-shaped press-fit elements 21 formed in the respective portions 20. The press-fit element 21 is formed through a stamping process, in which a recess is formed on one surface of the plate member 18 and a height on the other surface.

The above plate members 18 are laminated by means of press-fitting the heights of the press-fit elements 21 of each plate member 18 into the corresponding recesses of the press-fit elements 21 of the plate member above, in order to prevent separating of the laminated plate members 18.

However, if the method employed for the core of the motor shown in FIG. 14 is directly adapted to the one-way clutch, the pressing force of the needles separates the laminated members. Further, if a large number of dot-shaped press-fit elements are formed in the plate member in order to sufficiently ensure a holding force generated by the press-fit elements, it produces a problem of an increased size of the entire one-way clutch.

SUMMARY OF THE INVENTION

It therefore is an object of the present invention to provide a one-way clutch apparatus having a small size and high strength and manufactured readily.

A feature in a first aspect of the present invention is that a one-way clutch including: a plurality of plate members each having at least one pair of a press-fit recess extending on one surface of the plate member and a press-fit height extending at a position, corresponding to the press-fit recess, on the other surface of the plate member; a casing provided for supporting a rotating shaft inserted into the casing, and including a laminate of the plate members press-fitted between the press-fit recess and the corresponding press-fit height respectively provided on adjacent plate members of the plate members; and a clutch mechanism provided inside the casing for permitting the rotating shaft to slide in the casing when the rotating shaft is rotated in one direction and locking the sliding of the rotating shaft in the casing when the rotating shaft is rotated in the other direction.

According to the first aspect, since the casing include the laminate of the plurality of the plate members. The plate members are laminated in such a manner that the press-fit height extending on a surface of each of the plate members is press-fitted into the press-fit recess extending on the corresponding surface of an adjacent plate member. Such extended press fit recess and height provide an effectively increased area for press fit to allow the press fit to be firmly maintained. This produces the effect of preventing the press-fit height from coming away from the press-fit recess after assembly even when a strong external force acts on the press-fitted part.

A feature of the one-way clutch in a second aspect of the present invention is that the press-fit recess and the press-fit height extend along the periphery of the plate member.

According to the second aspect, since each of the press-fit recess and the press-fit height extends along the periphery of the plate member, a force of holding the plate members together acts equally upon every part of the plate member. Further, extra space is not needed for forming such press-fit recess and height, which provide the effect of reducing in size of the overall one-way clutch.

A feature of the one-way clutch in a third aspect of the present invention is that the plate member is molded by punching in a press process and the press-fit recesses and the press-fit heights are molded through the press process.

According to the third aspect, the plate member is subjected to the punching process through the press process, and the press-fit recess and the press-fit height are also molded through the same press process, leading to the effects of providing the plate members with high accuracy and of facilitating the forming of the casing.

A feature of the one-way clutch in a fourth aspect of the present invention is that the plate members include a bottom plate member forming a bottom plate of the casing, intermediate plate members forming the clutch mechanism, and a lid plate member forming a lid of the casing.

According to the fourth aspect, since the plate members include a bottom plate member forming the bottom plate of the casing, intermediate plate members forming the clutch mechanism, and a lid plate member forming a lid of the casing, mechanism members of the clutch mechanism are assembled while being supported on the bottom plate member of the casing. After completion of the assembling, the lid plate member prevents the mechanism members from falling out. As a result, there is the effect of preventing the mechanism members of the clutch mechanism from falling out of the top or bottom of the casing.

A feature of the one-way clutch in a fifth aspect of the present invention is that the lid plate member includes a bearing hole for supporting the rotating shaft.

According to the fifth aspect, the provision of the bearing hole in the lid plate member for supporting the rotating shaft produces an effect of improving the bearing effect.

A feature of a one-way clutch in a sixth aspect of the present invention is to include a casing; a cover placed on the outside of the casing and made of materials having an expansion coefficient higher than that of the casing; and a plurality of fitting recesses and a plurality of fitting heights provided on an outer peripheral face of the casing and an inner peripheral face of the cover to engage each other, and each having joint faces including joint faces each facing in a circumferential direction and positioned on a straight line passing through a substantial center of the casing.

According to the sixth aspect, the plurality of the fitting recesses and the plurality of the fitting heights are provided on the outer peripheral face of the casing and the inner peripheral face of the cover to engage each other for a fit of the casing into the cover. Further, each of the fitting recesses and fitting heights has the joint faces of which the joint face facing in the circumferential direction is positioned on a straight line passing through a substantial center of the casing. Hence, even when the casing and the cover differ in an expansion coefficient, backlash is not produced in the rotation direction and also a misalignment is not produced between the rotation center of the rotating shaft and the rotation center of the cover, resulting in an extremely stable coupling between the rotating shaft and the cover in terms of the rotation direction.

Further, no clearance occurs between the joint faces of the respective fitting recess and height, which are facing in the circumferential direction. Due to the absence of clearance, transfer of a rotative force is performed in timing between the casing and the cover at all times.

Still further, due to the absence of clearance between the joint faces facing in the circumferential direction, the fitting recess does not ride over the fitting height. As a result, the cover and the casing do not go into a freewheeling condition.

A feature of the one-way clutch in a seventh aspect of the present invention is that pairs of the fitting recesses and the fitting heights are provided at regular intervals.

According to the seventh aspect, since pairs of the fitting recesses and heights are provided at regular intervals, when a load is imposed in a direction perpendicular to the rotating shaft, eccentricity does not occur between the casing and the cover, resulting in stable transfer of rotation.

A feature of the one-way clutch in an eighth aspect of the present invention is that two pairs of the fitting recesses and the fitting heights are provided on diametrical lines.

According to the eighth aspect, since the pairs of the fitting recesses and heights are provided on diametrical lines, even under thermal expansion, a stable coupling state can be adequately maintained only by two pairs of the fitting recesses and heights.

A feature of the one-way clutch in a ninth aspect of the present invention is that three pairs or more of the fitting recesses and the fitting heights are provided.

According to the ninth aspect, since three pairs or more of the fitting recesses and heights are provided, even under thermal expansion, the stability of coupling is maintained in every direction of 360 degrees.

Further, according to the seventh to ninth aspects, a plurality of pairs of fitting recesses and heights are provided at regular intervals. Hence, even when the cover expands greater than the casing, the cover is guided by the fitting recesses and the fitting heights to expand evenly to keep a perfect circle, and additionally the occurrence of eccentricity is prevented.

DETAILED DESCRIPTION OF THE PREFERRED EMBODIMENTS

FIG. 1 to FIG. 5 illustrate a first embodiment according to the present invention. A principal feature of the present invention is that metal plate members are shaped through the press process, and then the shaped plate members are laminated to form a casing 22 of a one-way clutch, and that press-fit elements extend along the rim of the casing 22. Apart from this feature the configuration is similar to that in the aforementioned examples of the prior art and a detailed description is omitted.

Figure 1:
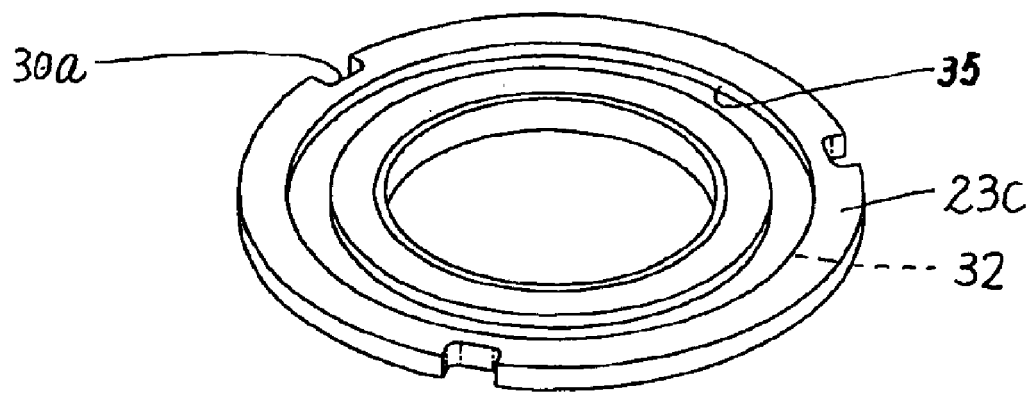
FIG. 1 is an exploded view illustrating the configuration of a one-way clutch of a first embodiment.
Figure 1:
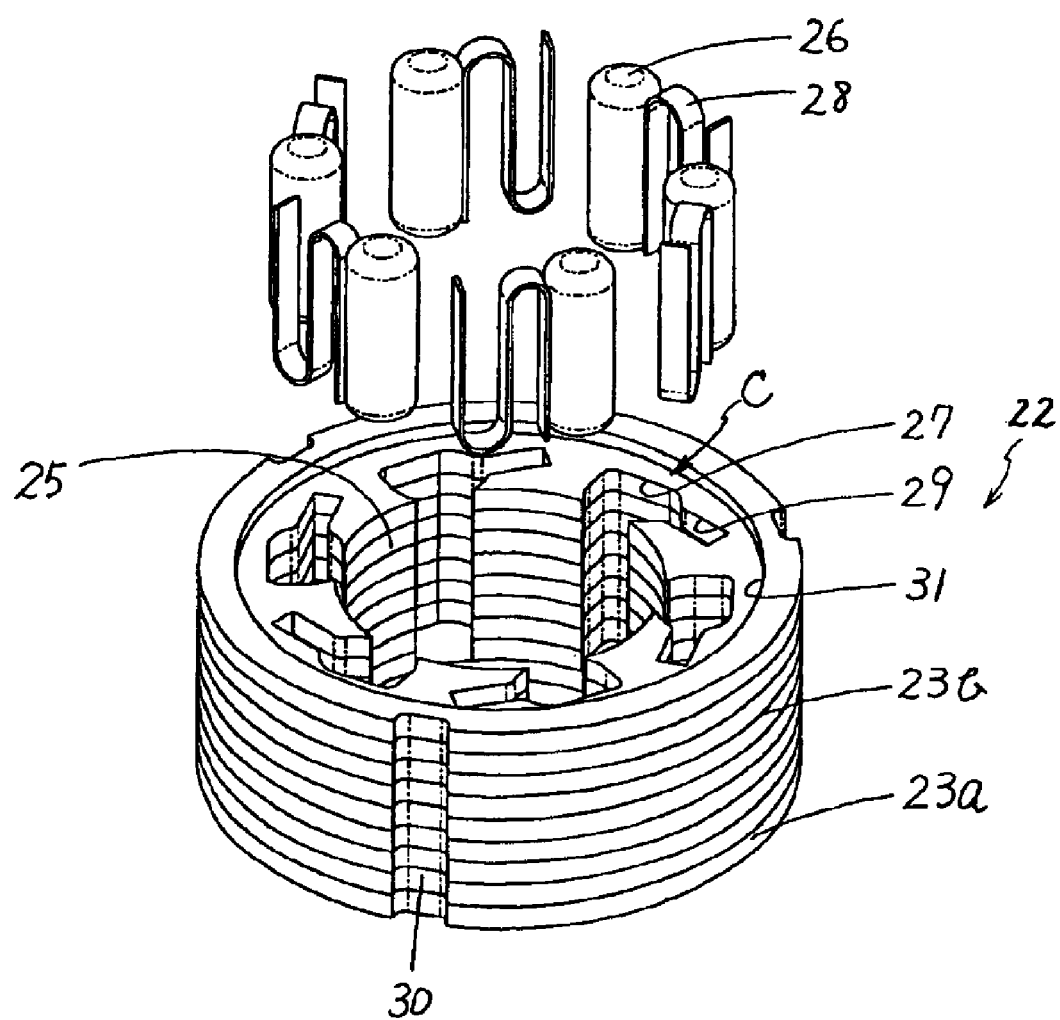
Figure 2:
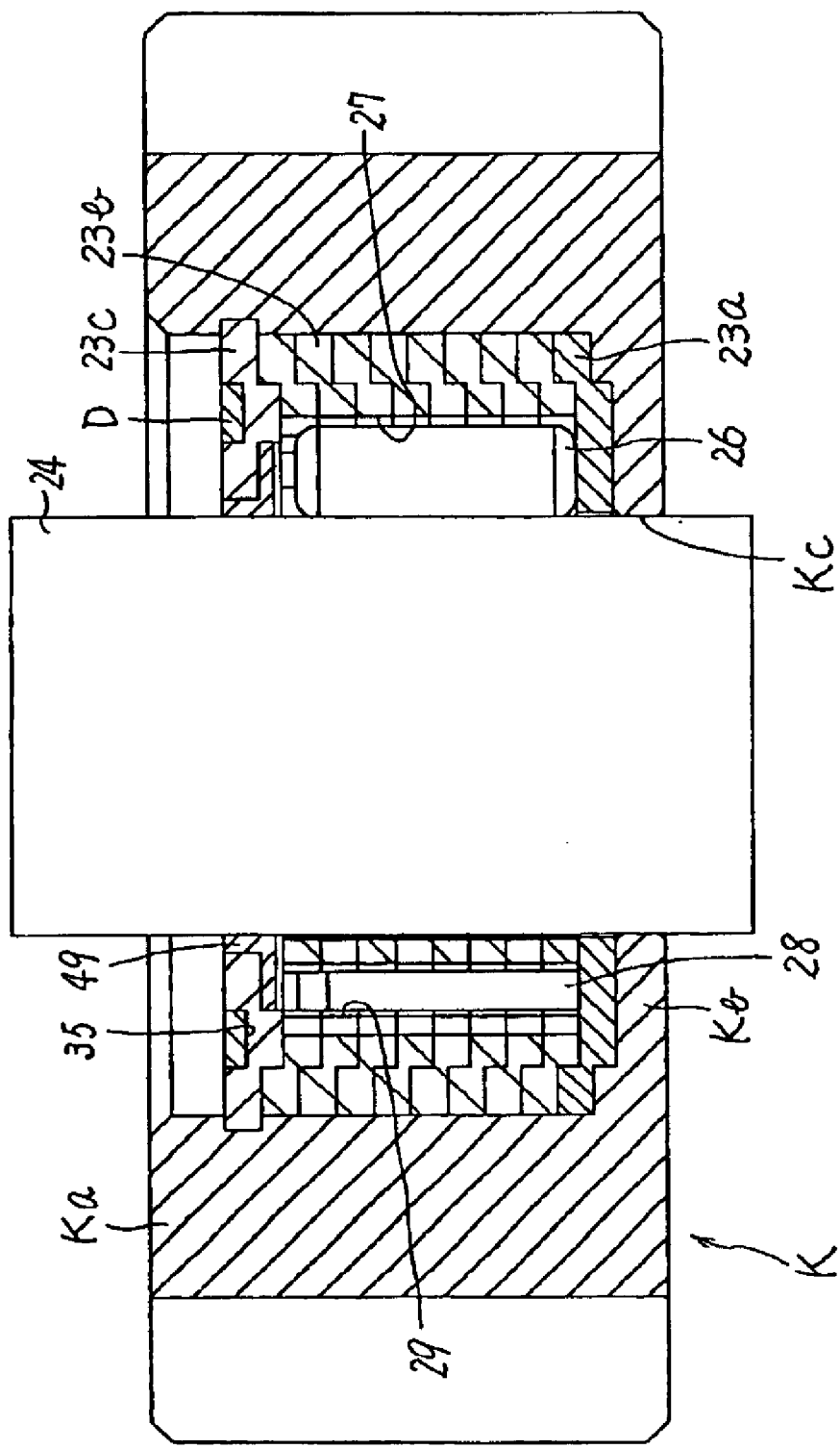
FIG. 2 is a sectional view of the assembled one-way clutch in FIG. 1.

FIG. 1 shows a general view of the casing 22 of the first embodiment. FIG. 2 is a sectional view illustrating the situation when the casing 22 is incorporated into a cover K and a rotating shaft 24 is inserted into the casing 22. The cover K shown in FIG. 2 is designed for gear-parts, but can also be designed and used for pulley-parts or other components. As illustrated in FIGS. 1 and 2, the casing 22 includes a plurality of plate members. The plate members are a bottom plate member 23a in the undermost position, a lid plate member 23c in the uppermost position, and intermediate plate members 23b laminated therebetween.

The cover K consists of a cylinder Ka, and a closing portion Kb for closing one end of the cylinder Ka. The cylinder Ka has an inner peripheral face on which a plurality of fitting heights (not shown) are formed. The closing portion Kb has a bearing hole Kc for supporting the rotating shaft 24. The cover K is made of resin and includes the cylinder Ka, the closing portion Kb, the heights, and the bearing hole Kc which are integrally formed.

Figure 3:
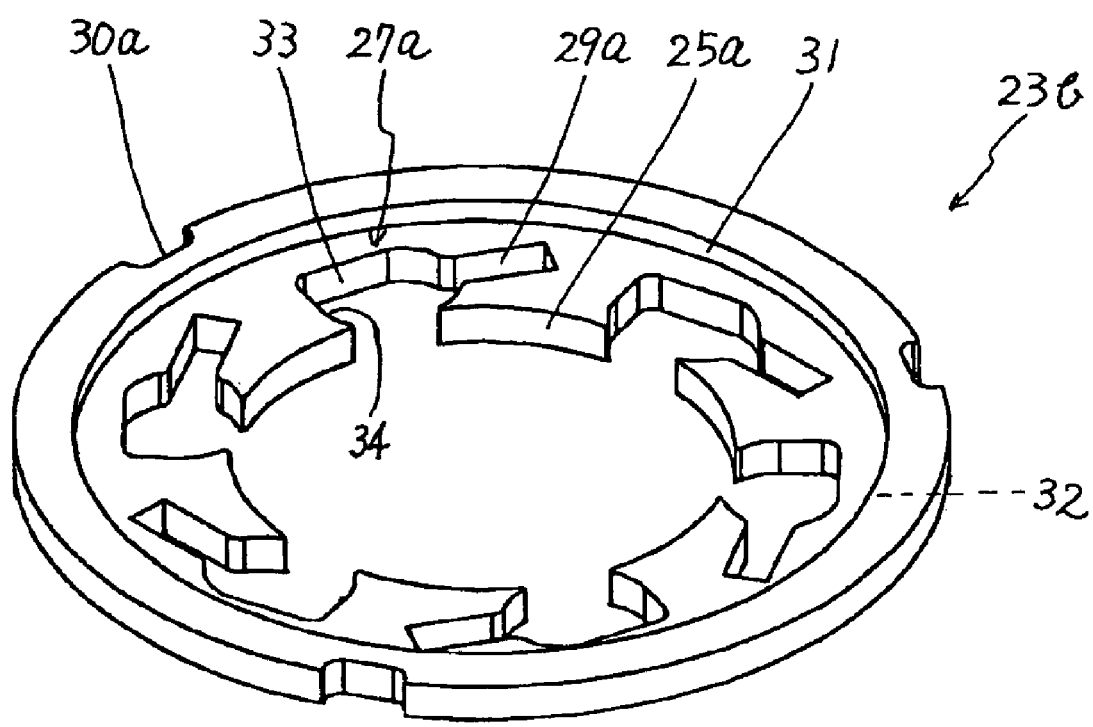
FIG. 3 illustrates an intermediate plate member 23b according to the first embodiment.
Figure 4:
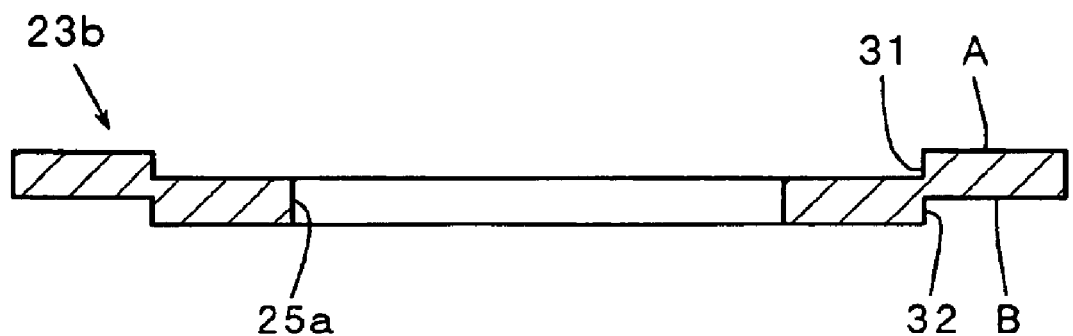
FIG. 4 is a sectional view of the intermediate plate member 23b in FIG. 3.

FIG. 3 is an enlarged view of the intermediate plate member 23b. The intermediate plate member 23b has a shaft hole portion 25a into which the rotating shaft 24 is inserted, and a plurality of needle hole portions 27a provided for insertion of the respective needles 26 around the shaft hole portion 25a.

Around the shaft hole portion 25a a plurality of spring hole portions 29a are also provided for insertion of the respective spring members 28 each producing a spring force acting on the needle 26, and open toward the respective needle hole portions 27a.

The intermediate plate member 23b has an outer periphery on which a plurality of fitting recess components 30a extend.

A press-fit element is provided in the proximity of the outer edges of the needle hole portions 27a and spring hole portions 29a of the intermediate plate member 23b. The press-fit element will be described with reference to the sectional view of the intermediate plate member 23b in FIG. 4.

A press-fit recess 31 extends along the rim of one surface A of the intermediate plate member 23b, and a press-fit height 32 extends at a position, corresponding to the press-fit recess 31, on the other surface B. The press-fit recess 31 and the press-fit height 32 are shaped in a circle along the outer periphery of the casing 22.

The press-fit recess and height 31, 32 are molded by stamping the intermediate plate member 23b in the press process.

The bottom plate member 23a has the press-fit recess 31 on one surface A and the press-fit height 32 on the other surface B, as in the case of the intermediate plate member 23b.

As illustrated in FIG. 1 the lid plate member 23c has the same press-fit height 32 as that formed on the intermediate plate member 23b, and a press-fit recess 35 differing in shape from that formed on the intermediate plate member 23b. As illustrated in FIG. 2, a ring-shaped embedded member D is press-fitted into the press-fit recess 35.

However, the bottom and lid plate members 23a, 23c do not have the needle hole portion 27a and the spring hole portion 29a. That is, only the shaft hole portion 25a is opened in the bottom and lid plate members 23a, 23c.

The bottom plate member 23a may not necessarily have a press-fit height equal in shape to that formed on the intermediate plate member 23b. However, if a press-fit height equal in shape to that formed on the intermediate plate member 23b is formed on the bottom plate member 23a as in the first embodiment, the bottom plate member 23a and the intermediate plate member 23b can be molded using the same die.

A plurality of intermediate plate members 23b each having the press-fit recess 31 and press-fit height 32, the bottom plate member 23a, and the lid plate member 23c are laminated to form the casing 22.

Specifically, as illustrated in FIG. 1, a first intermediate plate member 23b is positioned on the bottom plate member 23a. The press-fit height 32 of the first intermediate plate member 23b is then press-fitted into the press-fit recess 31 of the bottom plate member 23b. After completion of the press fit of the first intermediate plate member 23b onto the bottom plate member 23a, a second intermediate plate member 23b is positioned on the first intermediate plate member 23b, and then is similarly press-fitted onto the first intermediate plate member 23b. In this way, eight intermediate plate members 23b in the first embodiment are positioned and press-fitted for lamination. The intermediate plate members 23b are positioned in such a manner as to establish proper vertical alignment of the needle hole portions 27a opened in each plate member 23b with the respectively corresponding needle hole portions 27a opened in the other plate members 23b, and of the spring hole portions 29a opened in each plate member 23b with the respectively corresponding needle hole portions 27a opened in the other plate members 23b.

In this way, the casing 22 is constructed by press-fitting the intermediate plate members 23b onto the bottom plate member 23a in the condition that the needle hole portions 27a and the like are neatly aligned. Inside the resulting casing 22 each alignment of the aligned needle hole portions 27a of the individual intermediate plate members 23b forms a continuous single needle hole 27 holding a needle 26. Likewise, each alignment of the aligned spring hole portions 29a of the individual intermediate plate members 23b forms a continuous single spring hole 29 holding a spring member 28. It should be mentioned that the needles, spring members, needle holes and spring holes in accordance with the present invention described herein form a clutch mechanism c.

Each of the above plurality of needle holes 27 includes a sloped face 33 and a supporting face 34. The sloped face 33 is inclined toward the supporting face 34 from the spring hole 29. In other words, the length between the sloped face 33 and the outer peripheral face of the rotating shaft 24 is designed to be longer in the proximity of the spring hole 14, and shorter in the proximity of the supporting face 34. A clamping element is formed at the position of the short length between the sloped face 33 and the outer periphery of the rotating shaft 24. The clamping element is equivalent to the position at which the rotating shaft 24 is locked by the needle 26 pressed into the clamping element as in the case of the examples of the prior art.

When the needle 26 is situated in the proximity of the spring hole 29, the needle hole 27 has a size allowing an easy rotation of the needle 26.

After completion of laminating the above-described plate members to form the needle holes 27 and spring holes 29, the needle 26 is inserted into each of the needle holes 27 and the spring member 28 is inserted into each of the spring holes 29. Due to the positioning of the bottom plate member 23a at the bottom of the casing 22, the needle 26 and spring member 28 inserted into the needle hole 27 and spring hole 29 are supported by the bottom plate member 23a to prevent their falling out of the bottom of the plate members.

After completion of inserting the needles 26 and spring members 28 into the casing 22, the lid plate member 23c is press-fitted to the uppermost of the laminated intermediate plate members 23b. Specifically, the press-fit height 32 of the lid plate member 23c is press-fitted into the press-fit recess 31 of the uppermost intermediate plate members 23b. Such press-fitting of the lid plate member 23c with the uppermost intermediate plate member 23b provides the covering of the casing 22 with a lid. In the press fit of the lid plate member 23c, each fitting recess component 30a provided on the outer periphery of the intermediate plate member 23b is neatly aligned with a fitting recess component 30a provided on that of the lid plate member 23c.

Such provision of the lid prevents the needle 26 and spring member 28 from falling after insertion even when the one-way clutch apparatus is turned upside down.

With such press-fitting of a plurality of the intermediate plate members 23b onto the bottom plate member 23a and of the lid plate member 23c onto the uppermost intermediate plate member 23b, the shaft hole portions 25a opened in the respective plate members form a continuous shaft hole 25 into which the rotating shaft 24 is inserted.

Near the internal rim of the lid plate member 23c a bearing member 49 is press-fitted. The bearing member 49 and a bearing hole Kc of the cover K support the rotating shaft 24 on the bearing. The bearing member 49 is desirably made of materials suitable for a bearing facility, such as copper. Instead of providing the bearing member 49, an internal rim portion of the lid plate member 23c can serve as a bearing for directly supporting the rotating shaft 24, in which case the lid plate member 23c needs to be made of materials suitable for the bearing facility and to be provided with a bearing hole at its central portion.

As a result of the press-fitting of the plate members 23a, 23b and 23c to each other as described above, the fitting recess components 30a form a continuous fitting recess 30 on the outer peripheral face of the casing 22. The fitting recesses 30 engage the respectively fitting heights (not shown) provided on the inner peripheral face of the cover K. With the engagement between the fitting heights of the cover and the fitting recesses 30, the casing 22 is incorporated into the cover. Further, the engagement between the fitting heights and the fitting recesses 30 does not allow a sliding movement of the casing 22 on the inner peripheral face of the cover K.

In the one-way clutch as described above, the bottom plate member 23a and the plurality of the intermediate plate members 23b are laminated to form the casing 22. For laminating the bottom plate member 23a and the plurality of the intermediate plate members 23b, a lamination press method can be employed. The lamination press method is a working process in which plate material are punched and then piled up for press-fitting to fabricate a laminated press product.

In the first embodiment, the bottom plate member 23a differs in configuration of an internal rim from the intermediate plate member 23b. The bottom plate member 23a has the shaft hole portion 25a only, but the intermediate plate member 23b has the shaft hole portion 25a with the needle holes and so on. Due to the different configuration of the internal rim between the bottom and intermediate plate members 23a and 23b, the casing 22 is constructed by the following method.

For the bottom plate member 23a, the plate material is punched with a bore puncher for opening only a shaft hole portion 25a. Then, an inner circle is punched in an intermediate plate member 23b which will be laminated on the bottom plate member 23a. At this point, the puncher for forming the inner circle of the bottom plate member 23a is momentarily changed to the puncher for punching the inner circle of the intermediate plate member 23b. That is, the puncher for the bottom plate member 23a is removed, thereafter the puncher for the intermediate plate member 23b is moved into position.

After completion of the punching of the internal circle shape, the bottom plate member 23a and the intermediate plate member 23b are semi-punched for forming the press-fit recess 31 and press-fit height 32, and then fully punched for the external rim.

Then, a plurality of the intermediate plate members 23b are laminated on the above bottom plate member 23a. When a required number of plate members 23b are laminated on the plate member 23a, all the plate members are press-fitted. With the press fit, the laminated bottom and intermediate plate members 23a and 23b are combined to form the casing 22.

Then, the needles 26 and spring members 28 are inserted into the above-formed casing 22, and then the lid plate member 23c is press-fitted onto the resulting casing 22.

In the first embodiment, after the press-fitting of the lid plate member 23c, the embedded member D is press-fitted into the press-fit recess 35 of the lid plate member 23c.

Next, the operation of the one-way clutch configured as described above will be described with reference to FIG. 5 illustrating a view of the one-way clutch from which the lid plate member 23c is removed, when viewed from the top.

Figure 5:
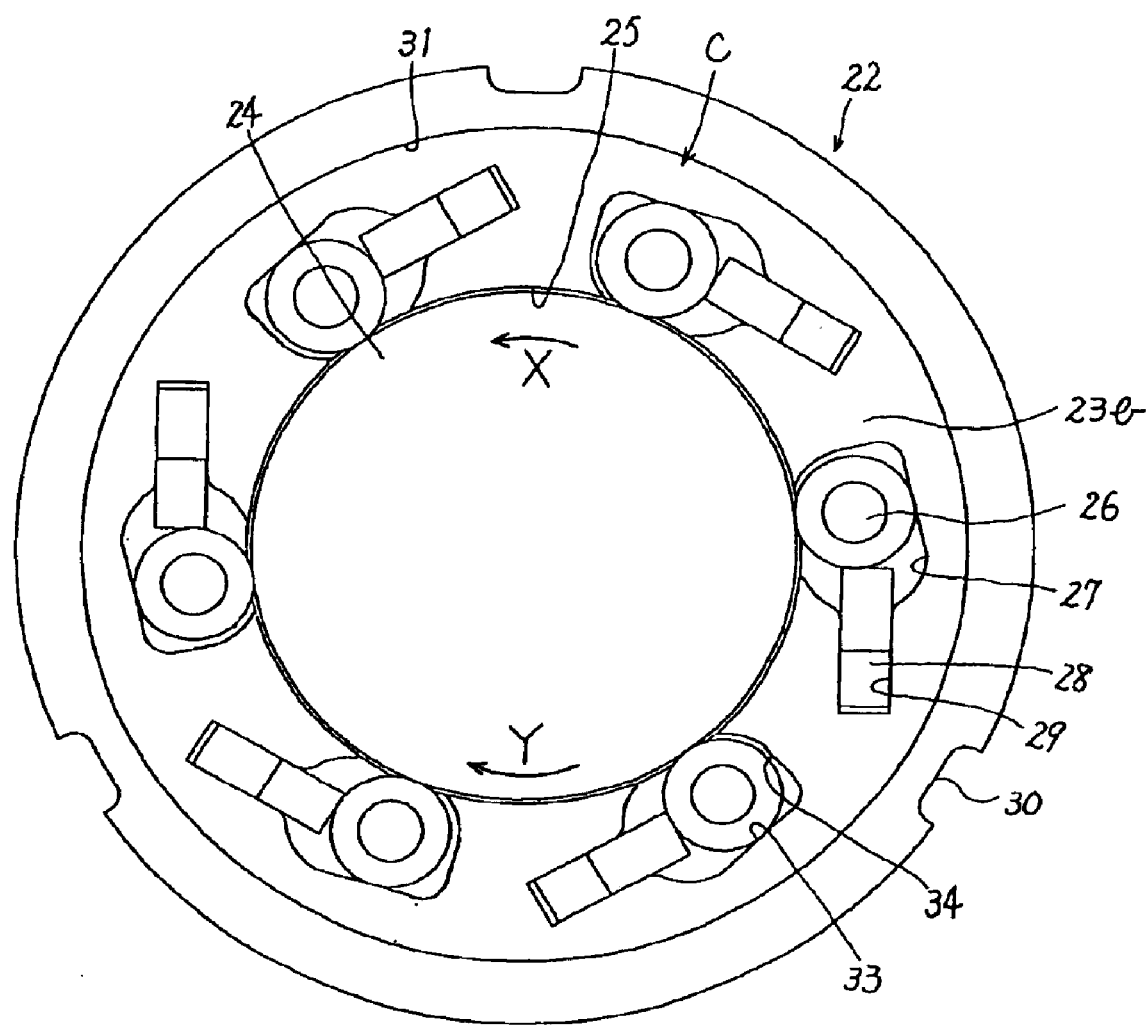
FIG. 5 is a top view of the assembled one-way clutch apparatus in FIG. 2 from which a lid plate member 23c is removed.

In FIG. 5, the rotating shaft 24 is designed to be locked so as not to produce relative displacement to the casing 22 when it is rotated in the direction indicated by the arrow X, whereas in the case of rotation in the direction indicated by the arrow Y, the rotating shaft 24 is free to produce relative displacement to the casing 22.

Specifically, as the rotating shaft 24 is rotated in the direction X, each of the needles 26 is pressed further into the aforementioned clamping element. In other words, each needle 26 increases in pressing force against the rotating shaft 24. The pressing force of the needles 26 locks the rotation of the rotating shaft 24. When the rotating shaft 24 is locked, it cannot rotate relatively to the casing 22. Accordingly, the entire casing 22 is rotated in the direction X with the rotation of the rotating shaft 24.

Conversely, when the rotating shaft 24 is rotated in the direction indicated by the arrow Y in FIG. 5, the rotating of the shaft 24 causes each needle 26 to move toward the spring hole 29 while deforming the spring member 28. The needle 26 moved toward the spring hole 29 rotates with the rotation of the shaft 24. In other words, the needle 26 is not strongly pressed onto the rotating shaft 24, and therefore does not lock the rotation of the rotating shaft 24 relative to the casing 22. That is, the rotating shaft 24 is maintained in a free rotation condition.

Hence, when the rotating shaft is rotated in the direction Y, the rotating does not cause a rotation of the casing 22.

According to the first embodiment as described above, the press-fit recesses 31 and the press-fit heights 32 are shaped into a ring along the rim of the casing 22 on a plurality of the plate members forming the casing 22. The plate members are laminated through press fit between the press-fit recess 31 on each of the plate members and the corresponding press-fit height 32 on the adjacent plate member. In consequence, the holding force caused between the plate members by the press fit is equally maintained over the entire periphery. Further, a larger area for press-fitting can be ensured as compared with that in a conventional press-fit method, resulting in a higher holding force.

In this way, the press-fit recesses 31 and the press-fit heights 32 increase the holding force between the plate members. For this reason, even if a large pressing force caused by the needles 26 acts on the plate members, the press-fit height 32 is not removed from the press-fit recess 31.

Further, extra space is not required for providing the press-fit recesses 31 and the press-fit heights 32 because they extend along the rim of the casing 22, which achieves a reduction in size of the casing 22.

When the press-fit element is provided in dot form as in the case of the prior art, a sufficient space is needed around each of the dots in order to maintain the strength of the press-fit element. In the first embodiment of the present invention, however, due to the provision of only one large annular-shaped press-fit element, a space for maintaining the strength of the press-fit element is required only around the annular shape. The space is smaller than that provided in the prior art in terms of the overall casing. Accordingly, the casing 22 in the first embodiment can be significantly reduced in size.

According to the first embodiment, as there is no need of a large space for each dot of the press-fit element as that provided in the case of the prior art, the spring hole can be widened in cross section by the amount of the unwanted space. Such a widened spring hole allows the use of various springs, and therefore it is easy to employ a structure in which the needle 26 is pushed by a spring with a wide plane. Pushing the needle 26 with a wider plane allows the needle 26 to be stably supported and to be prevented from tilting.

Since the needle 26 does not tilt, the needle 26 has a decreased force of separating the laminated plate members.

Further, in the first embodiment, the processes for the punching of the bottom plate member 23a, the punching of a plurality of intermediate plate members 23b and the press-fitting of these plate members are performed as a series of processes in a continuous production line. Hence, the manufacture is easier and the efficiency of working is enhanced. Due to the smooth work and a high efficiency of working, a reduction in cost of the entire one-way clutch can be achieved.

The lid plate member 23c is press-fitted with the uppermost of the laminated intermediate plate members 23c, and the bearing member 49 is press-fitted with the lid plate member 23c to support the rotating shaft 24 on the bearing. This design effects a reliable rotatable support for a rotating shaft, and requires a lower degree of precision for the dimensional accuracy of the shaft hole portion 25a of the bottom or intermediate plate member 23a, 23b than that required for the bearing.

Further, according to the one-way clutch of the first embodiment, the thickness of the entire one-way clutch can be optionally varied simply by changing the number of laminated intermediate plate members 23b. Because there is no need of an extra apparatus for changing the number of laminated plate members, the design can be readily changed at low cost.

Employing the press process for fabricating the intermediate plate members 23b maintains a high accuracy of the intermediate plate members 23b. Since such highly accurate intermediate plate members 23b are laminated to form the casing 22, it is also possible to maintain the overall casing 22 at a high degree of accuracy. In particular, the press process provides for the maintaining of the accuracy of small elements such as the needle hole 27 and the spring hole 29.

In the first embodiment, after completion of the press-fitting of the lid plate member 23c to the casing 22, the embedded member D is press-fitted into the press-fit recess 31 of the lid plate member 23c, but press-fitting of the embedded member D is not necessary required. If the press-fitting of the embedded member D is not provided, the press-fit recess 35 is not needed on the lid plate member 23c.

However, if the embedded member D is press-fitted into the press-fit recess 31 of the lid plate member 23c, this can strengthen the press fit between lid plate member 23c and the highest intermediate plate member 23b, the press fit between adjacent intermediate plate members 23b, and the press fit between the lowest intermediate plate member 23b and the bottom plate member 23a.

Figure 6:
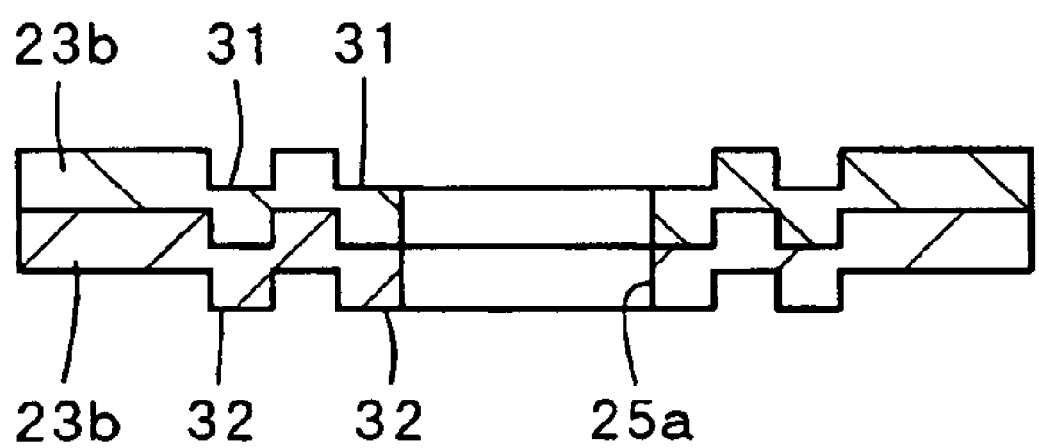
FIG. 6 is a sectional view of a modified example of the first embodiment.

In the first embodiment, a single pair of press-fit recess 31 and height 32 is provided, but the present invention is not limited to providing a single pair. As illustrated in FIG. 6, a plurality of press-fit recesses 31 and press-fit heights 32 may be provided on a single intermediate plate member 23b.

With the press-fitting of a plurality of press-fit recesses 31 and corresponding press-fit heights 32 in this way, adjacent intermediate plate members 23b are more firmly held.

Figure 7:
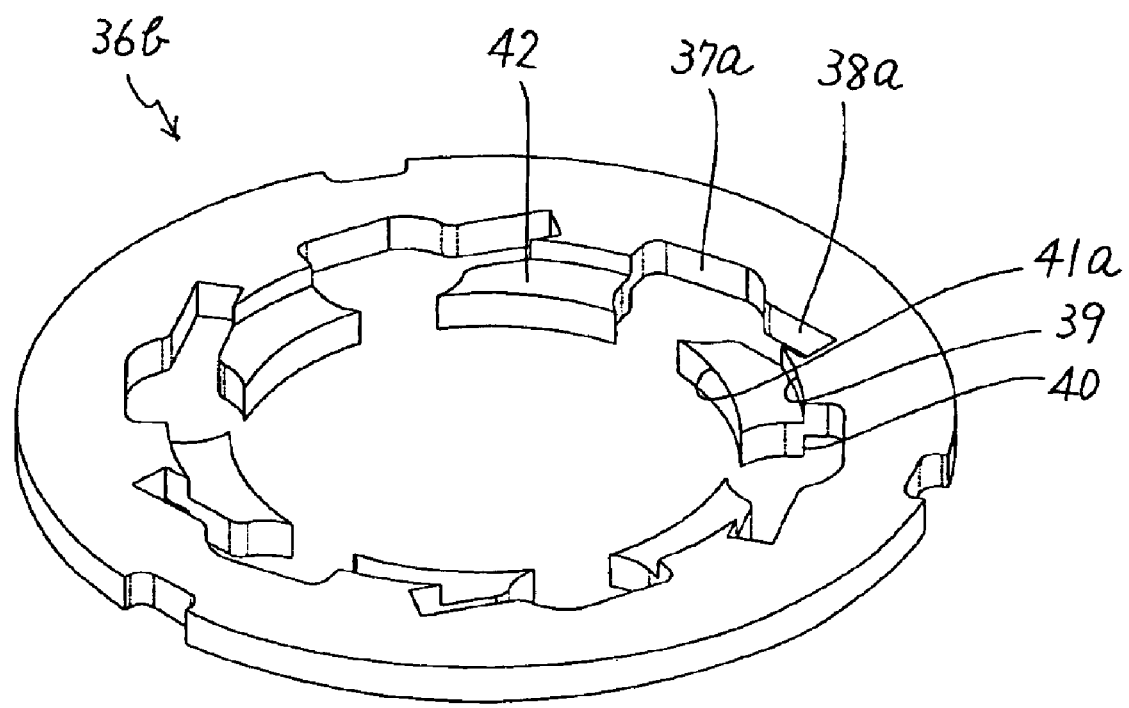
FIG. 7 is a view illustrating an intermediate plate member 36b according to a second embodiment.

FIG. 7 illustrates a second embodiment according to the present invention. A principal feature in the second embodiment of the present invention is that a press-fit element of an intermediate plate member 36b is formed on a needle hole portion 37a and a spring hole portion 38a. Apart from this feature the configuration is similar to that in the aforementioned first embodiment. The components that are the same as or similar to those in the first embodiment are designated by the same reference numbers as those used in the first embodiment and the detailed description is omitted.

As illustrated in FIG. 7, in the second embodiment, each of press-fit recesses 39 and each of press-fit heights 40 are provided in a portion of each intermediate plate member 36b where the needle hole portion 37a and spring hole portion 38a are opened. Specifically, the intermediate plate member 36b has a shaft hole portion 41a, and a plurality of needle hole portions 37a and a plurality of spring hole portions 38a are opened around the shaft hole portion 41a.

When the needle hole portions 37a and spring hole portions 38a are opened around the shaft hole portion 41a, a plurality of protrusions 42 are provided between adjacent pairs of the needle hole portion 37a and spring hole portion 38a.

Although the press-fit recess 39 and height 40 are cut by the needle hole portion 37a and spring hole portion 38a, they are formed concentrically along the outer rim of the intermediate plate member 36b. That is, the provision of a plurality of protrusions 42 allows the press-fit recesses 39 and heights 40 to exist along the outer rim of the intermediate plate member 36b.

A bottom plate member 36a and a lid plate member 36c, not shown, have also such press-fit elements at positions corresponding to the press-fit recesses 39 and press-fit heights 40 provided on the intermediate plate member 36b.

After the press-fit recesses 39 and heights 40 are formed on the bottom, intermediate, and lid plate members 36a, 36b and 36c as explained above, the bottom plate member 36a and intermediate plate members 36b are press-fitted through the press process as in the case of the first embodiment, to form a casing. The needles and spring members are then inserted into the casing, and the casing is covered with the lid plate member 36c. The lid plate member 36c also undergoes press-fitting through the press process.

In the one-way clutch of the second embodiment constructed as described above, the operation for locking and releasing the rotating shaft is performed as in the case of the first embodiment, of which a detailed description is omitted.

In the one-way clutch of the second embodiment, the press-fit recess 39 and height 40 extend on the protrusion 42 forming part of the needle hole portion 37a and part of the spring hole portion 38a. This design makes it much harder for the press-fit height 40 to be separated from the press-fit recess 39. To explain the reason, in the one-way clutch a very strong separating force generated in the press-fit element acts on the needle hole portion 37a against which the needle is strongly pressed when the rotating shaft is locked. In the second embodiment, however, since the press-fit recess 39 and the press-fit height 40 extend on the protrusion 42 which forms the needle hole portion 37a acted upon by the strong force, the holding force between adjacent intermediate plate members 36b can be more effectively maintained.

Figure 8:
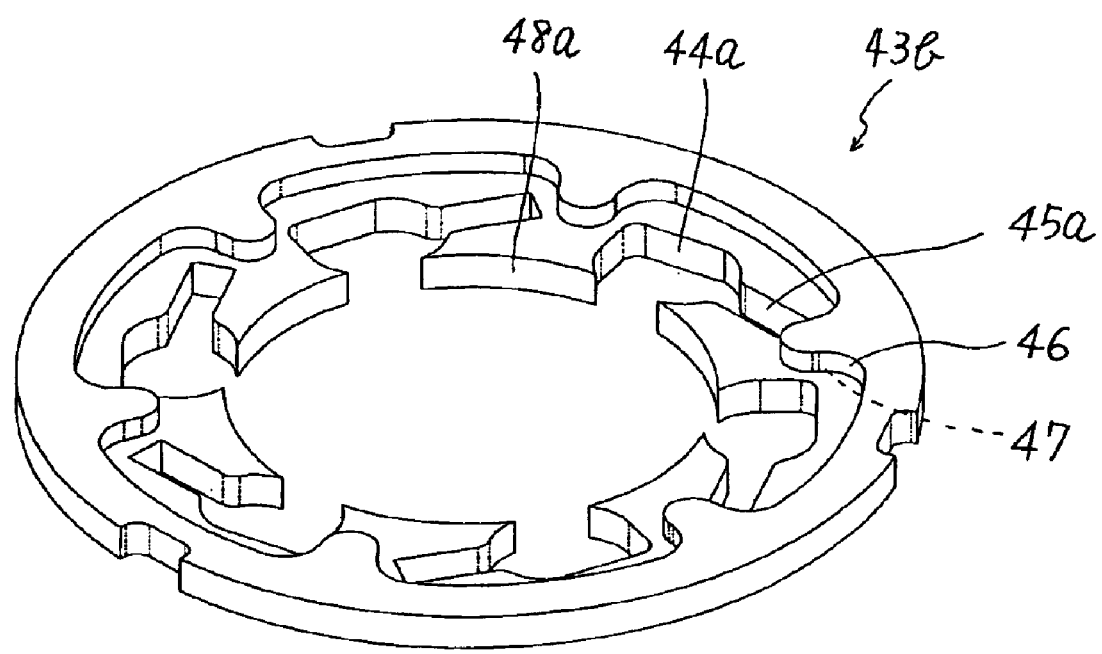
FIG. 8 is a view illustrating an intermediate plate member 43b according to a third embodiment.

FIG. 8 illustrates a third embodiment according to the present invention. A principal feature in the third embodiment of the present invention is that a press-fit element of an intermediate plate member 43b extend around edges of needle hole portions 44a and spring hole portions 45a. The same reference numerals as those used in the first and second embodiments designate the components that are the same as or similar to those of the first and second embodiments. A detailed description of the components that are the same as or similar to those in the first and second embodiments is omitted.

As illustrated in FIG. 8, in the third embodiment, a press-fit recess 46 and a press-fit height 47 extend around edges of the needle hole portions 44a and spring hole portions 45a of the intermediate plate member 43b.

Such provision of the press-fit recess 46 and height 47 along the edges of the needle and spring hole portions 44a and 45a results in the provision of them along the full rim of the intermediate plate member 43b.

A bottom plate member and a lid plate member, not shown, have also such press-fit elements at positions corresponding to the press-fit recess 46 and the press-fit height 47 extending on the intermediate plate member 43b.

After the press-fit recesses 46 and heights 47 are formed on the bottom plate member, intermediate plate members 43b, and lid plate member as explained above, the bottom plate member and intermediate plate members 43b are press-fitted through the press process as in the case of the second embodiment, to form a casing. The needles and spring members are then inserted into the casing and the casing is covered with the lid plate member. The lid plate member also undergoes press-fitting through the press process.

In the one-way clutch of the third embodiment constructed as described above, the operation for locking and releasing the rotating shaft is performed as in the case of the first embodiment, of which a detailed description is omitted.

In the one-way clutch of the third embodiment, the press-fit recess 46 and height 47 extend along edges of the needle hole portions 44a and spring hole portions 45a. This design makes it much harder for the press-fit recess 46 and the press-fit height 47 to be separated. To explain the reason, in the one-way clutch a significantly strong force of separating the press-fit element acts, in the casing, on the needle hole portion 44a against which the needle is strongly pressed when the rotating shaft is locked. Therefore, the press-fit recess 46 and height 47 are formed along the needle hole portion 44a acted upon by the strong force, and each press-fit recess 46 is press-fitted with the corresponding press-fit height 47. This makes it possible to more effectively maintain the holding force between adjacent intermediate plate members 43b.

Further, according to the third embodiment, the press-fit recess 46 and height 47 having a wider area can be provided. This achieves a firmer holding force between adjacent intermediate plate members 43b, and prevents a press-fit recess 46 and the corresponding press-fit recess 47 from separating from each other.

Figure 9:
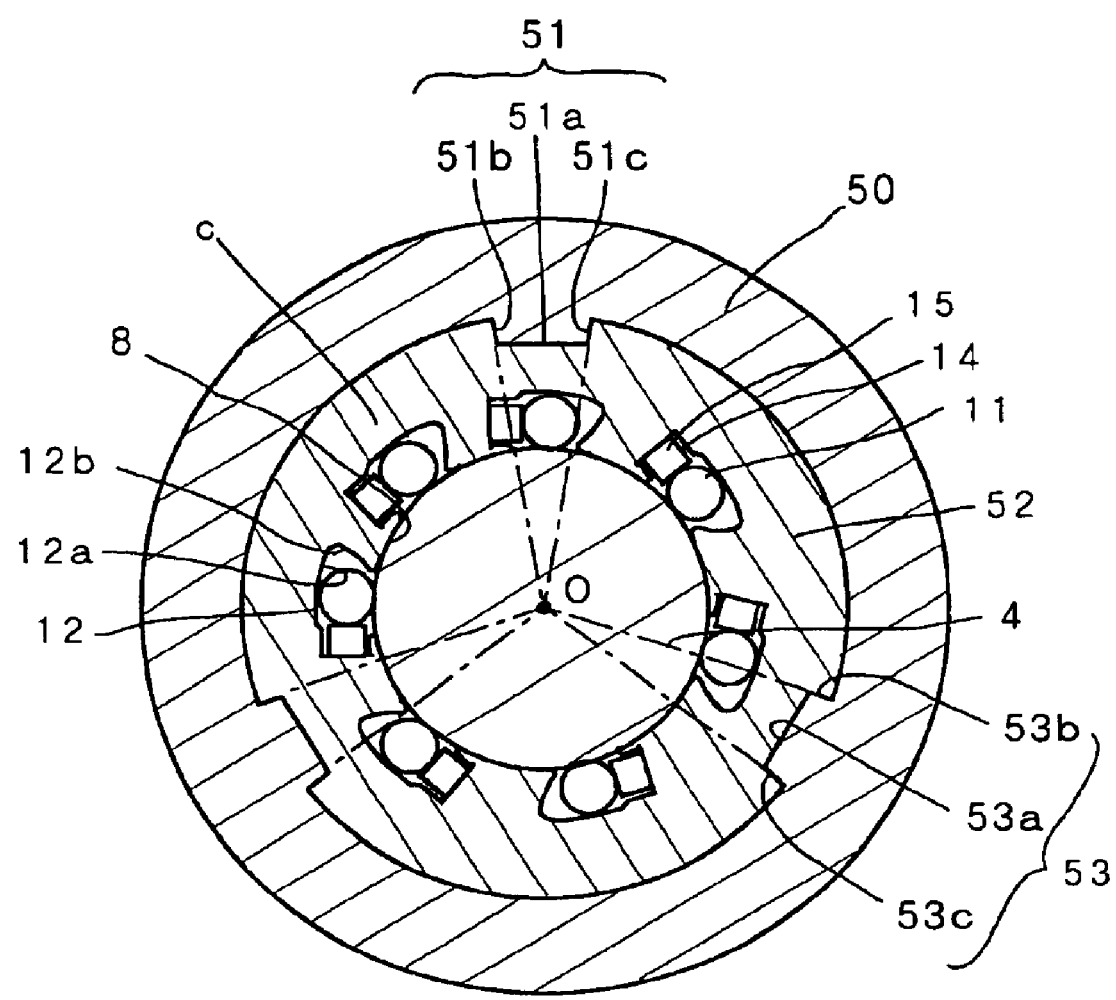
FIG. 9 is a sectional view of a one-way clutch according to a fourth embodiment.

FIG. 9 illustrates a fourth embodiment according to the present invention. In the fourth embodiment, a material for a cover 50 is resin and a material for a casing 52 is a metal. The reason why the casing 52 is made of a metal is for maintaining the strength of the casing 52 as described earlier. The reason why the cover 50 is made of resin is for ease of molding and low cost. The cover 50 is attached with a gear, a pulley or the like for use as required. In some cases, the cover 50 and the gear may be integrally molded of resin. The cover 50 made of resin allows a reduction in component count and costs.

As illustrated in FIG. 9, the resin-made cover 50 has fitting heights 51 and the metal-made casing 52 has fitting recesses 53 engaging with the respective fitting heights 51. Further, the casing 52 is constructed by a laminate of a plurality of plate members as in the cases of the first to third embodiments. The laminating method is the same as that in the first to third embodiments.

In the fourth embodiment, the three fitting heights 51 are provided on the inner peripheral face of the cover 50 at regular intervals. Likewise, the three fitting recesses 53 are provided on the outer peripheral face of the casing 52 at regular intervals.

The cover 50 and the casing 52 are assembled in such a manner so as to provide for fitting the fitting recesses 53 of the casing 52 with the fitting heights 51 of the cover 50, respectively.

The fitting height 51 has joint faces 51a, 51b and 51c and the fitting recess 53 has joint faces 53a, 53b and 53c. When the cover 50 and casing 52 are assembled, the joint face 51a is joined to the joint face 53a, and in an analogous fashion, the joint faces 51b, 51c are joined to the respective joint faces 53b, 53c. The joint faces 51b, 51c and the joint faces 53b, 53c face in the circumferential direction in accordance with the present invention.

Each of the joint faces 51b, 51c, 53b and 53c facing in the circumferential direction has an extension line passing through the center O of the casing 52.

Other components in the fourth embodiment are the same as or similar to those in the example of the prior art. The components that are the same as or similar to those in the example of the prior art are designated by the same reference numbers as those used in the example of the prior art and a detailed description is omitted.

Figure 10:
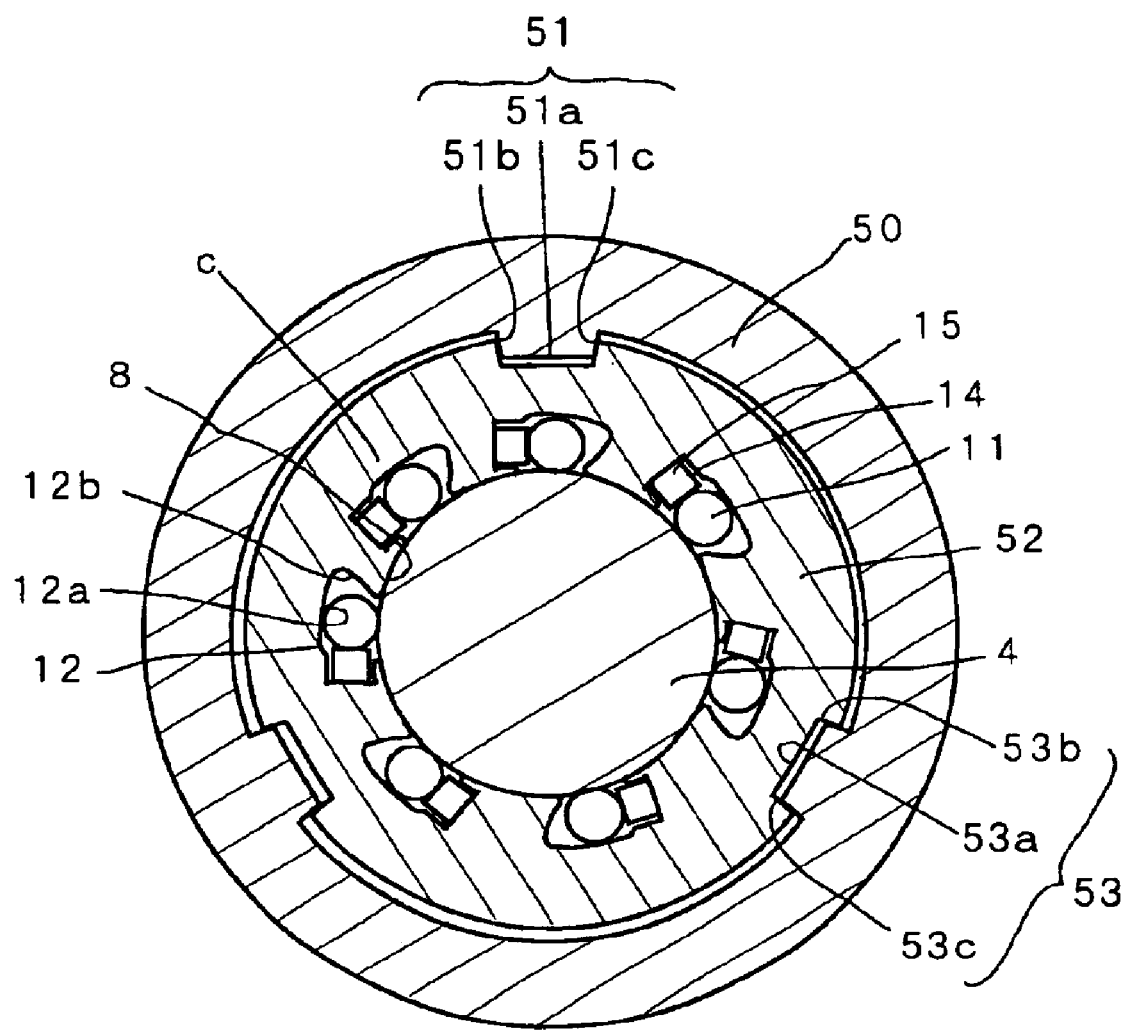
FIG. 10 is a view illustrating the one-way clutch in FIG. 9 when expanded due to high temperatures.

FIG. 10 illustrates a situation in which the one-way clutch configured as described thus far is under the influence of high temperatures. When subjected to high temperatures, the resin cover 50 expands more than the metal casing 52 due to a difference in the expansion coefficient of resin and metal. When the cover 50 significantly expands, each fitting recess 51 of the cover 50 expands to the same degree, causing the joint faces 51b, 51c facing in the circumferential direction to slide on the joint faces 53b, 53c of the fitting recess 53 of the casing 52.

Specifically, each of the joint faces 51b, 51c facing in the circumferential direction of the cover 50 is positioned on a line passing through the center. At the time of expansion, the cover 50 expands in the diameter direction without changing its center. Accordingly each of the joint faces 51b, 51c facing in the circumferential direction is not displaced from the line passing through the center even under expansion.

Likewise, each of the joint faces 53b, 53c facing in the circumferential direction of the casing is positioned on a line passing through the center, and therefore they are not displaced from the line even under expansion. As a result, the joint faces 51b, 51c and the joint faces 53b, 53c facing in the circumferential direction slide.

In this way, each of the joint faces 51b, 51c, 53b and 53c facing in the circumferential direction is not displaced from the center line. Hence, even under expansion of the cover 50 and the casing 52, no clearance is produced between the joint faces 51b, 51c and 53b, 53c. The absence of clearance between the joint faces 51b, 51c and 53b, 53c facing in the circumferential direction ensures the non-occurrence of play.

In other words, backlash does not occur in the rotation direction and also a misalignment is not produced between the rotation center of the rotating shaft and the rotation center of the cover.

As long as the joint faces 51b, 51c facing in the circumferential direction are in contact with the respective joint faces 53b, 53c facing in the circumferential direction, the fitting recess 53 never rides over the fitting height 51. This is because the joint faces 51b and 53b and the joint faces 51c and 53c are positioned on the respective straight lines passing through the center.

At the time of expansion of the cover 50, the fitting height 51 slides outward from the fitting recess 53. Therefore, the fitting recess 53 is not pressured by the fitting height 51 when the cover 50 expands. Due to the absence of interference between the height 51 and the recess 53 as described above, the cover 50 is not distorted under expansion. In turn, an adverse effect is not produced on, for example, the engagement of a gear which is integrated with the one-way clutch, due to distortion of the cover 50.

Further, since pairs of the fitting heights 51 and recesses 53 are provided at regular intervals, the cover 50 can be guided by the fitting heights 51 and the fitting recesses 53 to expand evenly to keep a perfect circle.

The above-described arrangement of pairs of the fitting heights 51 and recesses 53 at regular intervals prevents the occurrence of eccentricity between the casing and the cover when a load is imposed in a direction perpendicular to the rotating shaft, to achieve a stable transfer of rotation.

Three pairs of the fitting heights 51 and recesses 53 are provided in the circumferential direction at regular intervals in the fourth embodiment, but the present invention is not limited to three pairs. The pairs of fitting heights and recesses can be set at any number from two pairs or more. The more the number of pairs of fitting heights and recesses is increased, the more securely the cover 50 and the casing 52 are fastened. Further, a higher number of pairs of fitting heights and recesses achieves the maintenance of stability of coupling in every direction of 360 degrees even when the casing and the cover are expanded by heat.

Figure 11:
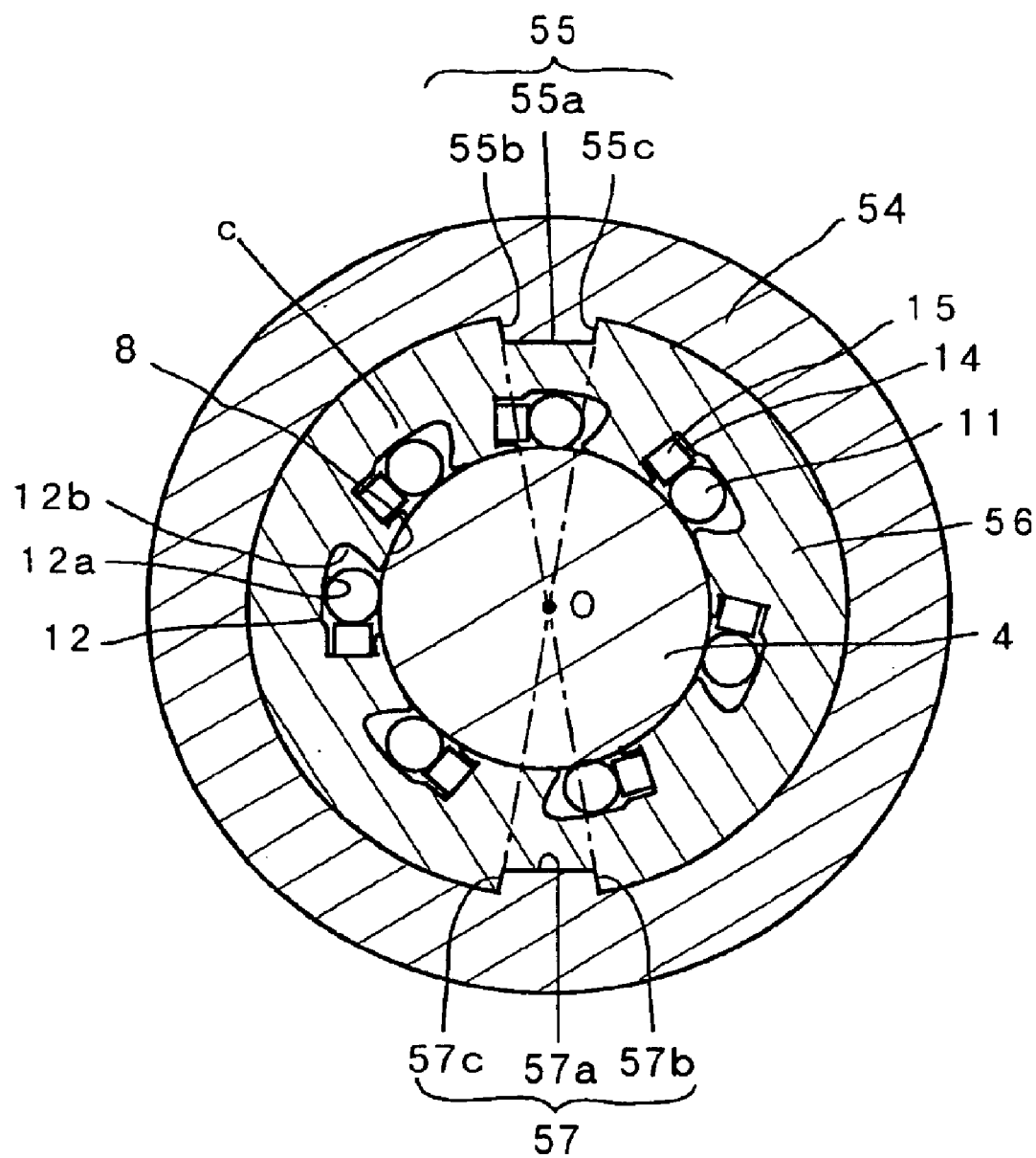
FIG. 11 is a sectional view of a one-way clutch apparatus according to a fifth embodiment.
Figure 12:
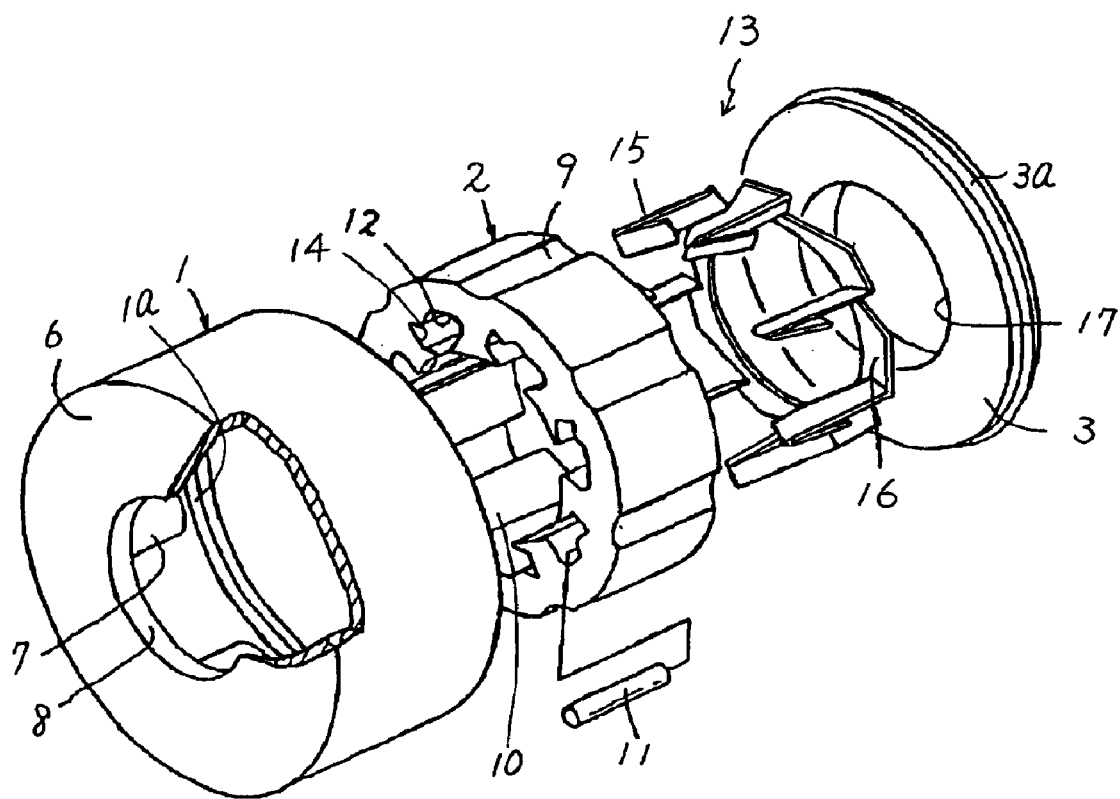
FIG. 12 is an exploded view of the overall configuration of a conventional one-way clutch.
Figure 13:
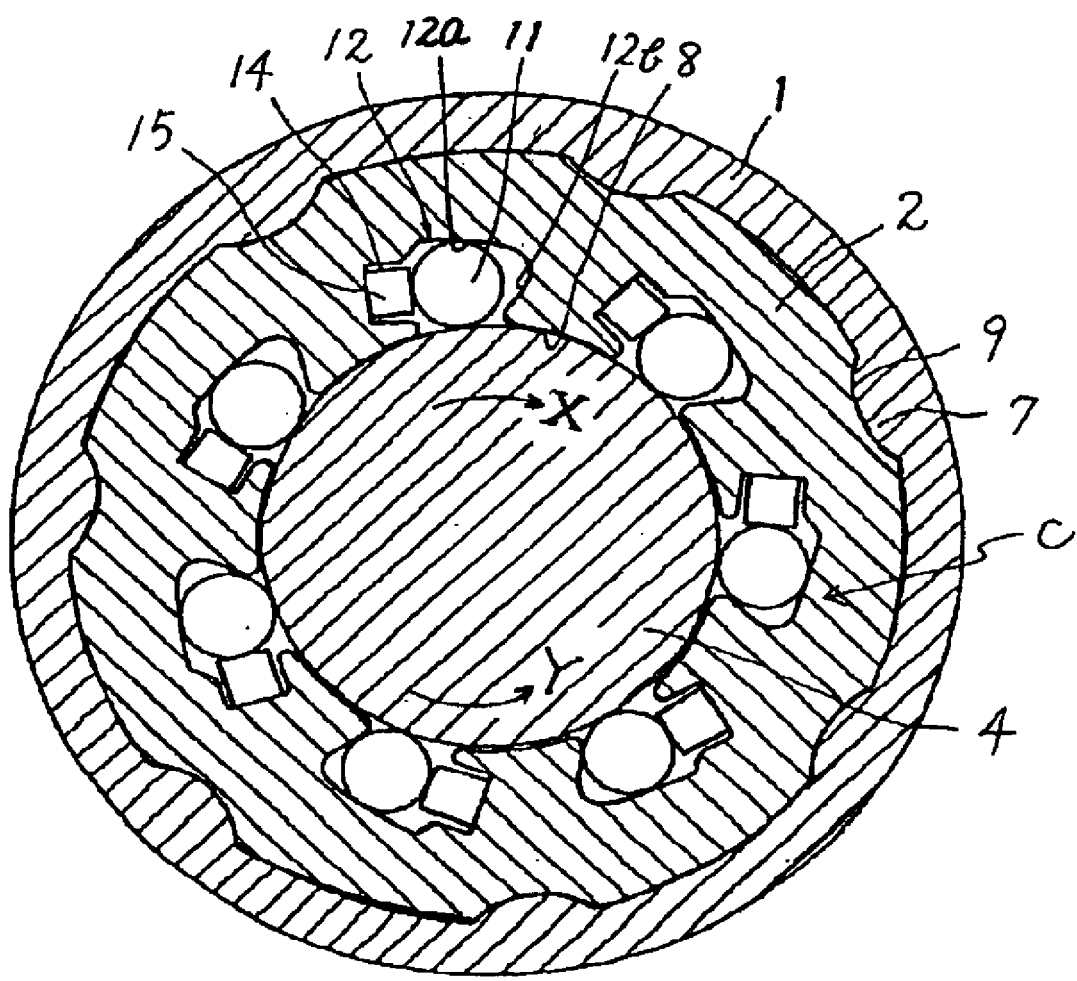
FIG. 13 is a sectional view of the assembled one-way clutch in FIG. 12.
Figure 14:
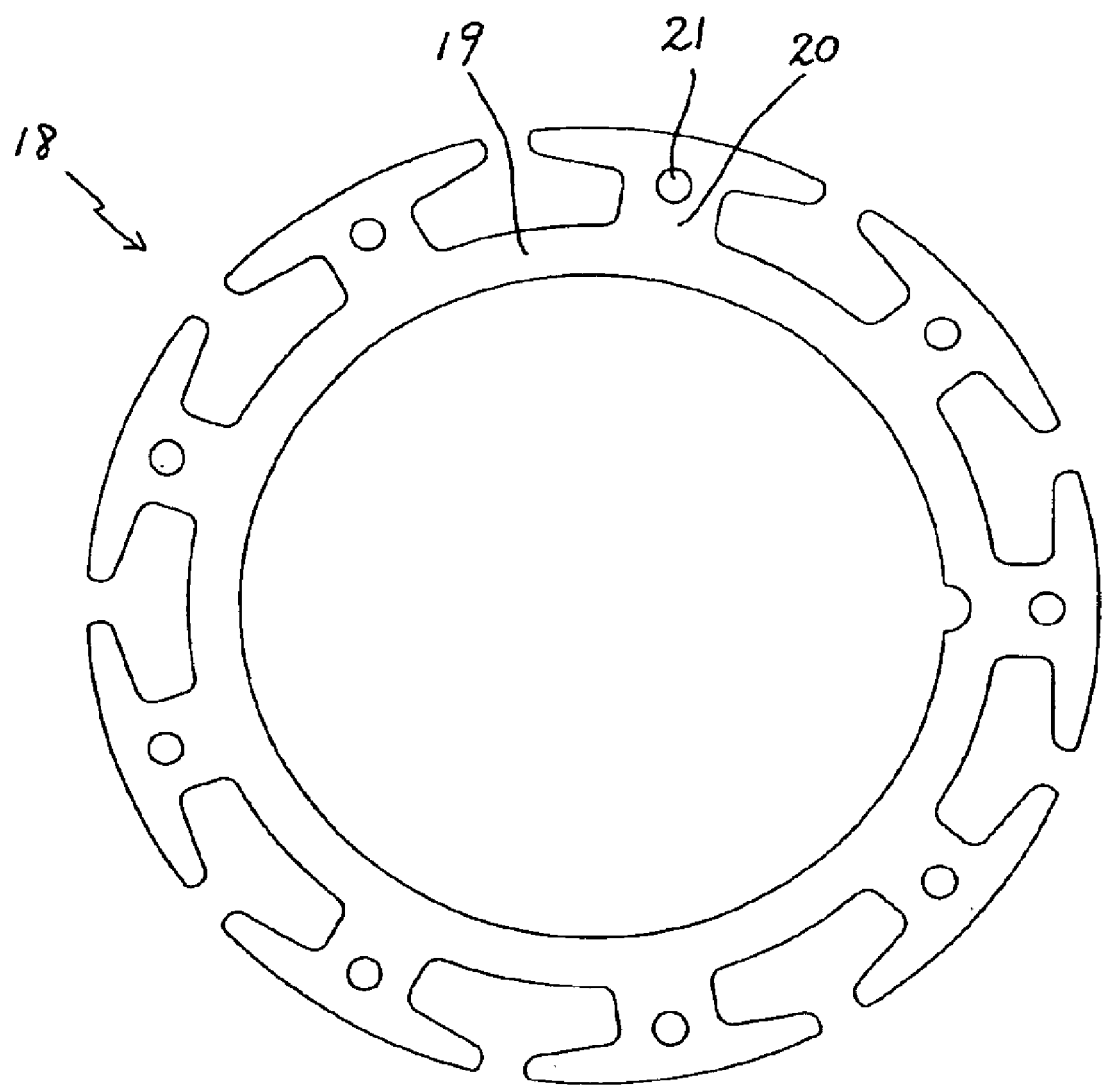
FIG. 14 is a front view of one of laminated plates used for a motor.

FIG. 11 illustrates a fifth embodiment in which a feature of the present invention is the provision of two pairs of fitting heights 55 and fitting recesses 57 on diameterical lines. Apart from this feature the components are the same as or similar to those in the fourth embodiment. The components that are the same as or similar to those in the fourth embodiment are designated by the same reference numerals as those used in the fourth embodiment and a detailed description is omitted.

In the fifth embodiment, a cover 54 is made of resin and a casing 56 is made of a metal. The casing 56 is constructed by laminating a plurality of plate members.

The fitting height 55 has joint faces 55a, 55b and 55c, and the fitting recess 57 has joint faces 57a, 57b and 57c. When the casing 56 is assembled into the cover 54, the joint face 55a is joined to the joint face 57a, and the joint faces 55b, 55c facing in the circumferential direction are joined to the respective joint faces 57b, 57c facing in the circumferential direction.

Each of the joint faces 55b, 55c, 57b and 57c facing in the circumferential direction has an extension line passing through the center 0 of the casing. In other words, each of the joint faces 55b, 55c, 57b and 57c is designed to extend along a straight line passing through a central portion of the casing 56.

In the fourth and fifth embodiments, the fitting height is provided to the cover and the fitting recess is provided to the casing, but conversely the fitting recess may be provided to the cover and the fitting height may be provided to the casing.

The foregoing has described the cover and so on shaped in circle by way example, but the present invention is not limited to this shape. The cover and so on can be designed in various shapes, e.g., a box shape.

Explanation of Reference Numerals

22 CASING
23a BOTTOM PLATE MEMBER
23b INTERMEDIATE PLATE MEMBER
23c LID PLATE MEMBER
24 ROTATING SHAFT
25 SHAFT HOLE
25a SHAFT HOLE PORTION
31 PRESS-FIT RECESS
32 PRESS-FIT HEIGHT
36a INTERMEDIATE PLATE MEMBER
39 PRESS-FIT RECESS
40 PRESS-FIT HEIGHT
41a SHAFT HOLE
43b INTERMEDIATE PLATE MEMBER
46 PRESS-FIT RECESS
47 PRESS-FIT HEIGHT
48a SHAFT HOLE
c CLUTCH MECHANISM
50 COVER
51 FITTING HEIGHT
51b JOINT FACE
51c JOINT FACE
52 CASING
53 FITTING RECESS
53b JOINT FACE
53c JOINT FACE
54 COVER
55 FITTING HEIGHT
55b JOINT FACE
55c JOINT FACE
56 CASING
57 FITTING RECESS
57b JOINT FACE
57c JOINT FACE
O CENTER

We claim:

1. A one-way clutch comprises:
    a plurality of plate members each having an annular press-fit recess formed along the circumference of one surface of the plate member and an annular press-fit height extending at a position, corresponding to the annular press-fit recess, formed along the circumference of the other surface of the plate member;
    a casing provided for supporting a rotating shaft inserted into the casing, and including a laminate of said plate members press-fitted between said press-fit recess and the corresponding press-fit height respectively provided on adjacent plate members of the plate members; and
    a clutch mechanism provided inside said casing for permitting the rotating shaft to slide in said casing when the rotating shaft is rotated in one direction and locking the sliding of the rotating shaft in the casing when the rotating shaft is rotated in the other direction.

2. A one-way clutch according to claim 1, wherein said annular press-fit recess and said press-fit height extend along an outer periphery of said plate member.

3. A one-way clutch according to claim 1, wherein said plate member is molded by punching in a press process and said annular press-fit recesses and said annular press-fit heights are molded through the same press process.

4. A one-way clutch according to claim 1, wherein said plate members include a bottom plate member forming a bottom plate of said casing, intermediate plate members forming said clutch mechanism, and a lid plate member forming a lid of said casing.

5. A one-way clutch according to claim 1, wherein said lid plate member includes a bearing hole for supporting the rotating shaft.

* * * * *